Dec. 15, 1953
L. C. MEYER
2,662,550
VALVE FOR CONTROLLING FLUID FLOW
BY VARIATION IN ELECTRIC CURRENT
Filed March 7, 1949
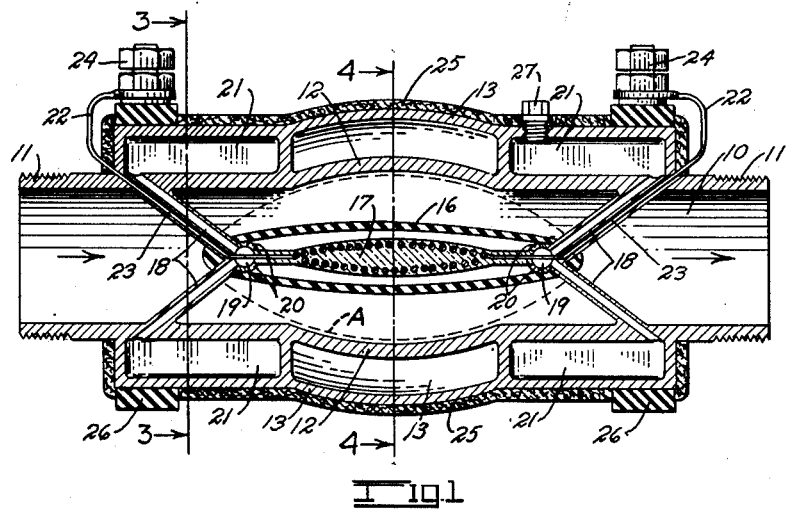
Fig. 1
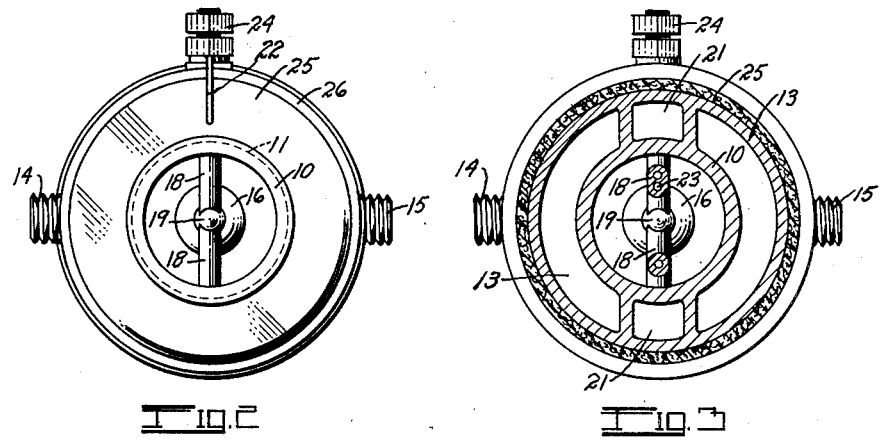
Fig. 2  Fig. 3
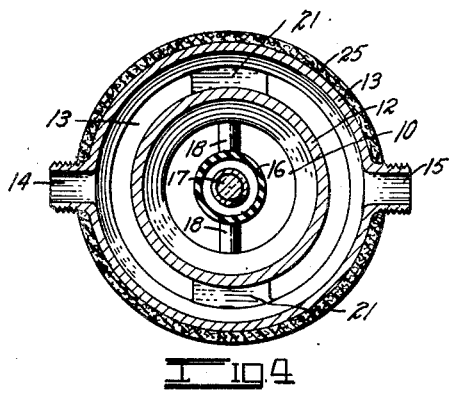
Fig. 4
INVENTOR.
LOUIS C. MEYER
BY
ATTORNEY

Patented Dec. 15, 1953

2,662,550

UNITED STATES PATENT OFFICE 2,662,550

VALVE FOR CONTROLLING FLUID FLOW BY VARIATION IN ELECTRIC CURRENT

Louis C. Meyer, near Mount Morrison, Colo., assignor of forty per cent to Andrew H. Meesters, Denver, Colo.

Application March 7, 1949, Serial No. 79,984

4 Claims. (Cl. 137—638)

This invention relates to what might be termed a thermal-valve, and has for its principal object the provision of a valve for the control of fluid flowing through a conduit in response to variations in electric current supplied to the valve.

Another object is to provide an electrically controlled valve in which very gradual and very accurate control may be had on the flow through the valve, and to provide a thermal-controlled valve which will not be affected by variations in atmospheric temperature about or within the valve.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a longitudinal section through the improved thermal-controlled valve;

Fig. 2 is an end view thereof;

Fig. 3 is a cross-section, taken on the line 3—3, Fig. 1; and

Fig. 4 is a similar cross-section, taken on the line 4—4, Fig. 1.

The improved valve is more particularly designed to accurately control the rate of flow of a fluid through a pipe, tube, or conduit, and is not intended for the rapid on and off operation of the usual electric solenoid valve. The valve may be formed of any material suitable for the use to which it is to be put, and may be made in any size as needed.

The valve consists of a tubular valve housing 10 having its extremities formed for connection with a fluid conduit. As illustrated, the extremities of the housing 10 are threaded as shown at 11 to receive conventional pipe couplings or fittings. At its middle the walls of the housing are swelled outward to form a bulbous mid-section 12.

The entire housing is surrounded by an outer jacket 13 which is spaced from and sealed to the housing to form a fluid jacket through which cooling or heating fluid may be circulated through the medium of intake and discharge nipples 14 and 15, respectively. The jacket 13 is completely surrounded by a layer of heat-insulating material 25, such as glass fiber or the like, to insulate the valve from external thermal influences.

An expansible member 16 of rubber or the like is mounted co-axially within the bulbous mid-section 12 of the housing 10. The expansible member 16 surrounds an electric heating element 17 which is supported at its extremities upon tubular arms 18 extending to the walls of the housing 10. The arms 18 terminate in spherical protuberances 19 provided with openings 20 communicating with the interior of the expansible member 16. The expansible member is stretched and mounted about the protuberances 19.

Each of the tubular arms 18 communicates with a reservoir 21, there being four arms and four reservoirs in the embodiment illustrated. The reservoirs are mounted on the exterior of the housing 10 within the confines of the outer jacket 13.

The electric terminals 22 from the heating element 17 extend through insulating channels 23 along two of the arms 18 to the exterior of the housing 10, where they are connected with suitable insulated binding posts 24 on the exterior of the jacket 13. The binding posts may be mounted in any desired manner. As illustrated, they are mounted upon electrical insulating rings 26.

The reservoirs 21, the tubular arms 18, and the expansible member 16 are filled with a thermal expansible fluid of any suitable type, dependent upon the particular use to which the device is put, such as mercury.

In use, the housing 10 is connected in the fluid conduit it is desired to control, and the binding posts 24 are connected to a control source of electrical current. Should it be desired to decrease the amount of fluid flowing through the housing 10, the amount of current flowing through the heating element is increased. This increases the temperature of the expansible fluid in the expansible member 16, causing the former to expand the latter toward the broken line position "A" in Fig. 1, thus restricting the flow through the bulbous mid-section 12 of the housing 10.

To increase the flow, it is only necessary to decrease the amount of current being supplied to the heating element 17, allowing the expansible member 16 to contract, due to its inherent elasticity and to external pressure.

Thus, it can be seen that very minute and accurate controls can be had of the flowing fluid. To prevent expansion and contraction from being caused by external and internal thermal changes, the temperature of the valve can be minutely controlled by supplying either a cooling or a heating fluid through the external jacket 13.

While a specific form of the improvement has been described and illustrated herein, it is to be under stood that the same may be varied, within the scope of the appended claims, without departing from the spirit of the invention.

Having thus described the invention, what is claimed and desired secured by Letters Patent is:

1. An electrically controlled valve comprising: a valve housing; a sealed, transversely expansible, fluid-containing member mounted axially within said housing; an electric heating element mounted coaxially within said expansible member; means for conducting electric current to said element to cause the latter to heat and expand the fluid in said expansible member thereby expanding the latter transversely within said housing to restrict the flow therethrough; and means preventing longitudinal expansion of said expansible member.

2. An electrically controlled valve comprising: a valve housing; an electrical heating element; arms extending radially inward from said valve housing and supporting said element axially therein; a transversal expansible sealed container surrounding said element; a thermally expansible fluid within said container; means for energizing said element so as to cause the latter to heat and expand the fluid within said container thereby expanding the latter transversal within said housing to restrict the flow therethrough; and means preventing longitudinal expansion of said expansible member.

3. A thermal-valve comprising: a tubular housing forming a fluid conduit; an elongated electrical heating element; means supporting said element in an axial position within said housing; a hollow, sealed, expansible member completely surrounding said element within said housing; and an expansible fluid filling said expansible member about said heating element and adapted to be expanded by the heat from said element to cause said expansible member to expand to restrict the flow through said housing, said expansible member being fixedly mounted at its extremities to prevent axial expansion thereof.

4. A thermal-valve structure as described in claim 3 having a hollow, cylindrical, fluid reservoir circumferentially surrounding said housing and a conduit communicating between said reservoir and said expansible member.

LOUIS C. MEYER.

References Cited in the file of this patent

UNITED STATES PATENTS

| Number | Name | Date |
|---|---|---|
| 478,688 | Clark | July 12, 1892 |
| 552,486 | Roney | Dec. 31, 1895 |
| 1,173,758 | Weczerzick | Feb. 29, 1916 |
| 1,180,282 | Bunn | Apr. 25, 1916 |
| 1,225,887 | Swan | May 15, 1917 |
| 1,441,549 | Wells | Jan. 9, 1923 |
| 1,593,855 | Tenney et al. | July 27, 1926 |
| 1,697,432 | Martin | Jan. 1, 1929 |
| 1,873,138 | Mitchell | Aug. 23, 1932 |
| 2,373,324 | Martin | Apr. 10, 1945 |

FOREIGN PATENTS

| Number | Country | Date |
|---|---|---|
| 397,239 | Great Britain | Aug. 24, 1933 |